United States Patent
Wentink

(10) Patent No.: US 9,628,226 B2
(45) Date of Patent: Apr. 18, 2017

(54) BLOCK ACKNOWLEDGEMENT WITH RETRANSMISSION POLICY DIFFERENTIATION

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 967 days.

(21) Appl. No.: 13/248,524

(22) Filed: Sep. 29, 2011

(65) Prior Publication Data

US 2012/0084616 A1   Apr. 5, 2012

Related U.S. Application Data

(60) Provisional application No. 61/388,300, filed on Sep. 30, 2010.

(51) Int. Cl.
| | |
|---|---|
| H04L 1/08 | (2006.01) |
| H04L 1/00 | (2006.01) |
| G06F 11/14 | (2006.01) |
| G06F 11/00 | (2006.01) |
| H04L 1/18 | (2006.01) |
| H04L 1/16 | (2006.01) |

(52) U.S. Cl.
CPC .......... *H04L 1/1896* (2013.01); *H04L 1/1614* (2013.01); *H04L 1/1825* (2013.01); *H04L 1/1642* (2013.01); *H04L 1/1887* (2013.01)

(58) Field of Classification Search
None
See application file for complete search history.

(56) References Cited

U.S. PATENT DOCUMENTS

| | | | |
|---|---|---|---|
| 2003/0002501 A1 | 1/2003 | Reme | |
| 2005/0195858 A1* | 9/2005 | Nishibayashi | H04L 1/1614 370/474 |
| 2006/0018332 A1* | 1/2006 | Kakani | H04L 1/1614 370/428 |
| 2006/0155856 A1 | 7/2006 | Nakashima et al. | |
| 2008/0144500 A1* | 6/2008 | Chen et al. | 370/235 |

(Continued)

FOREIGN PATENT DOCUMENTS

| | | |
|---|---|---|
| CN | 1691663 A | 11/2005 |
| CN | 101170725 A | 4/2008 |

(Continued)

OTHER PUBLICATIONS

RTP Retransmission Payload Format, The Internet Society, Jul. 2006, p. 3, https://tools.ietf.org/html/rfc4588#section-6.3.*

(Continued)

*Primary Examiner* — Justin R Knapp
(74) *Attorney, Agent, or Firm* — Kevin T. Cheatham

(57) ABSTRACT

One feature provides a Block Acknowledgement Retransmission Policy (BARP) frame that permits a transmitter to define a retransmission policy on a per-frame basis for frames transmitted in a block of frames. A block acknowledgement retransmission policy (BARP) frame is generated by a transmitter that individually identifies a retransmission policy for each frame in a block of frames. The BARP frame is then transmitted to a receiver, allowing the receiver to know which frames within a block of frames will be retransmitted and which frames will not be retransmitted.

54 Claims, 9 Drawing Sheets

*EXEMPLARY BLOCK ACKNOWLEDGEMENT RETRANSMISSION POLICY (BARP) FRAME*

(56) References Cited

U.S. PATENT DOCUMENTS

2009/0089641 A1     4/2009    Schedelbeck et al.
2010/0220678 A1     9/2010    Wentink

FOREIGN PATENT DOCUMENTS

| CN | 101594221 A | 12/2009 |
|---|---|---|
| EP | 1130839 A1 | 9/2001 |
| EP | 1571773 A2 | 9/2005 |
| EP | 1589704 A2 | 10/2005 |
| JP | 2001274861 A | 10/2001 |
| JP | 2005252897 A | 9/2005 |
| JP | 2005311920 A | 11/2005 |
| JP | 2006319696 A | 11/2006 |
| JP | 2007214920 A | 8/2007 |
| WO | 2004064333 A1 | 7/2004 |
| WO | 2009157901 A1 | 12/2009 |

OTHER PUBLICATIONS

International Search Report and Written Opinion—PCT/US2011/054442—ISA/EPO—Nov. 4, 2011.

Joshua Wall et al: "Adaptive Multimedia Packet Transmission for Broadband IEEE 802.11 Wireless Lans" Personal, Indoor and Mobile Radio Communications, 2006 IEEE 17th Inter National Symposium on, IEEE, PI, Sep. 1, 2006 (Sep. 1, 2006), pp. 1-5, XP031023437 ISBN: 978-1-4244-0329-5 the whole document.

Khan J., et al., "Adaptive Multimedia Packet Transmission for Broadband IEEE802.11 Wireless LANs", 2006 IEEE 17th International Symposium on Personal, Indoor and Mobile Radio Communications, Sep. 11, 2006-Sep. 14, 2006, pp. 1-5, <online>http://ieeexplore.ieee.org/xpl/articleDetails.jsp?tp=&arnumber=4022335.

Li T., et al., "Investigation of the Block ACK Scheme in Wireless Ad-hoc Networks", Wireless Communications and Mobile Computing, vol. 6, Issue 6, pp. 877-888, Sep. 2006.

\* cited by examiner

*EXEMPLARY MPDU*

| DATA UNIT | | LAYER |
|---|---|---|
| Host Layers | Data | Application Layer |
| | | Presentation Layer |
| | | Session Layer |
| | Segments | Transport Layer |
| Media Layers | Packet | Network Layer |
| | Frame | Data Link Layer (Logical Link Control / Media Access Control) |
| | Bits | Physical Layer |

*EXEMPLARY OPEN SYSTEMS INTERCONNECTION (OSI) MODEL*

*EXEMPLARY BLOCK ACKNOWLEDGEMENT RETRANSMISSION POLICY (BARP) FRAME*

*EXEMPLARY BLOCK ACKNOWLEDGEMENT RETRANSMISSION POLICY (BARP) FRAME*

BLOCK ACKNOWLEDGEMENT WITH RETRANSMISSION POLICY DIFFERENTIATION

CLAIM OF PRIORITY UNDER 35 U.S.C. §119

The present application for patent claims priority to U.S. Provisional Applications No. 61/388,300 entitled "Block Acknowledgement With Retransmission Policy Differentiation", filed Sep. 30, 2010, hereby expressly incorporated by reference herein.

BACKGROUND

Field

One feature relates to communication systems, and more particularly, to a method for differentiating retransmission policy within a plurality of protocol data units.

Background

In transmissions between a transmitter and a receiver, the transmitter may transmit a block (plurality) of frames, such as Media Access Control (MAC) Protocol Data Units (MPDUs), without requesting individual acknowledgements for each transmitted MPDU. This method is referred to as Block Acknowledgements, as defined in Institute of Electrical and Electronics Engineers (IEEE) Standard 802.11n-2009. The MPDUs may be aggregated as an Aggregated MPDU (A-MPDU), to allow multiple MPDUs to be transmitted as part of the same Physical Layer (PHY) Protocol Data Unit (PPDU). The receiver of the data stream may reply with a Block Acknowledgement (BA) which acknowledges the receipt of one or more frames at once. For instance, the BA may acknowledge received frames by setting an associated bit inside an Ack bitmap that is carried by the BA. The location of the bit inside the bitmap corresponds to the sequence number of the received frame. A receiver forwards MPDUs up the protocol stack according to their sequence number, but when an MPDU is not received, the receiver waits either until the MPDU with that sequence number has been retransmitted, or until the queue has been purged by a Block Acknowledgement Request (BAR) frame that increases the sequence number to beyond the missing MPDU. The BAR frame is transmitted by the source of the data stream when it no longer will retransmit old sequence numbers. So while the current BA rules allow for discarding frames at the receiver by purging the queue through a Block Acknowledgement Request (BAR) frame, but the discarding rules are the same for all frames in a single Block Acknowledgement (BA) agreement. For instance, a BAR frame may be transmitted by the transmitter to the receiver to request for a BA to be sent or to purge the queue at the receiver up until an indicated sequence number. Frames with a sequence number older than the sequence number indicated in a BAR frame will not be retransmitted. However, it is not possible to exclude individual frames from this policy.

According to one example, in a video stream transmitted using User Datagram Protocol (UDP), some frames may contain more important information than other frames. Frames which contain less important information may be dropped (i.e. not retried or not tried at all) sooner than frames which contain important information. Current BAR frames do not permit such per frame policy to be specified.

Therefore, a solution is needed that allows defining a policy whereby individual frames within a block of frames can be marked for retransmission while other frames are purged.

SUMMARY

A Block Acknowledgement Retransmission Policy (BARP) frame is provided that permits a transmitter to define a retransmission policy on a per-frame basis (i.e., frame by frame basis) for frames transmitted in a block of frames. The BARP frame allows the receiver to know which frames will be retransmitted and which frames will not be retransmitted.

A method operational on a transmitter device is disclosed that generates a block acknowledgement retransmission policy (BARP) frame that individually identifies a retransmission policy for each frame in a block of frames. The BARP frame may indicate which frames in the block of frames are to be retransmitted and which frames are not to be retransmitted. The block acknowledgement retransmission policy (BARP) frame is then sent to a receiver device. The BARP frame may be transmitted periodically or asynchronously or incidentally. The BARP frame may be transmitted as part of an aggregated Media Access Control (MAC) Protocol Data Unit (MPDU).

Before, concurrent with, or after the BARP frame is sent, the transmitter device may encapsulate data in the block of frames, wherein each frame is individually identified by a sequence number. The block of frames is then transmitted to the receiver device. A retransmission policy specified by the BARP frame may define which frames in the block of frames are to be retransmitted and which frames are not to be retransmitted. The block of frames may include frames containing content from a plurality of different senders, where high-reliability content is sent over frames designated for retransmission.

In one example, transmission of the block acknowledgement retransmission policy (BARP) frame may precede transmission of the block of frames. In another example, transmission of the block of frames may precede transmission of the block acknowledgement retransmission policy (BARP) frame. The block of frames may include both high-reliability frames and low-reliability frames, where high reliability frames may be defined for retransmission and low-reliability frames may be defined for no retransmission.

In various examples, frames that require acknowledgement by their sender may be identified for retransmission by the BARP frame. Meanwhile, frames that do not require acknowledgement by their sender may be identified for no retransmission by the BARP frame.

Subsequently, the transmitter device may retransmit only those frames identified for retransmission in the block acknowledgement retransmission policy frame.

According to one feature, the transmitter device may receive a block acknowledgement from the receiver device indicating which, if any, of the frames in the block were not received. As a result of such block acknowledgment, the transmitter device may retransmit only those missing frames identified for retransmission in the block acknowledgement retransmission policy frame.

Additionally, the transmitter device may subsequently generate and transmit a new block acknowledgement retransmission policy frame after transmission of the block of frames.

In one example, the transmitter device may be an interim point between one or more senders of content in the frames in the block of frames and the receiver device.

In one implementation, a transmitter device is provided comprising a communication interface and a memory device coupled to a processing circuit. The communication interface may serve to communicate with a receiver device. The communication interface may include a wireless transceiver circuit adapted for wireless communications. The memory device may store a protocol stack associated with transmissions over the communication interface. The processing circuit may be adapted or configured to: (a) generate a block acknowledgement retransmission policy (BARP) frame that individually identifies a retransmission policy for each frame in a block of frames; b) send the block acknowledgement retransmission policy frame to the receiver device; (c) encapsulate data in the block of frames, where each frame is individually identified by a sequence number; and/or send the block of frames to the receiver device. The block of frames may be formed at a data link layer of the protocol stack. In various implementations, transmission of the block acknowledgement retransmission policy (BARP) frame may precede transmission of the block of frames or transmission of the block of frames may precede transmission of the block acknowledgement retransmission policy (BARP) frame.

In one example, the processing circuit may be further adapted to retransmit only those frames identified for retransmission in the block acknowledgement retransmission policy frame.

In another example, the processing circuit may be further adapted to: (a) receive a block acknowledgement from the receiver device indicating which, if any, of the frames in the block were not received; and/or (b) retransmit only those missing frames identified for retransmission in the block acknowledgement retransmission policy frame.

Another implementation provides a processing circuit comprising: (a) a first circuit adapted to generate a block acknowledgement retransmission policy (BARP) frame that individually identifies a retransmission policy for each frame in a block of frames; (b) a second circuit adapted to send the block acknowledgement retransmission policy frame to a receiver device; and/or (c) a third circuit adapted to receive a block acknowledgement from the receiver device indicating that some of the frames in the block were not received. The second circuit may be further adapted to retransmit only those missing frames identified for retransmission in the block acknowledgement retransmission policy frame.

A method operational on a receiver device is also provided for receiving a block acknowledgement retransmission policy (BARP) frame that individually identifies a retransmission policy for each frame in a block of frames. Before, after or concurrent with the BARP frame, the receiver device may receive the frames from the block of frames. The receiver device may send the received frames to a higher layer of a protocol stack if all frames that have been identified for retransmission in the BARP frame have been received.

The receiver device may send a block acknowledgment indicating missing frames that should be retransmitted based on the BARP frame. In response, the receiver device may receive the missing frames which the BARP frame identified for retransmission. The receiver device may use the BARP frame to determine which frames in the block of frames should be dropped and which frames in the block of frames are necessary.

A retransmission policy specified by the BARP frame defines which frames in the block of frames are to be retransmitted and which frames are not to be retransmitted. Frames that require acknowledgement by their sender may be identified for retransmission by the BARP frame. Frames that do not require acknowledgement by their sender may be identified for no retransmission by the BARP frame. The block of frames may include both high-reliability frames and low-reliability frames. The high-reliability frames may be defined for retransmission and low-reliability frames are defined for no retransmission. The block of frames may include frames containing content from a plurality of different senders, where high-reliability content is sent over frames designated for retransmission.

In various implementations, the BARP frame may be received before and/or after the block of frames. The BARP frame may also be received periodically or asynchronously or incidentally. The BARP frame may be transmitted as part of an aggregated Media Access Control (MAC) Protocol Data Unit (MPDU).

A receiver device is also provided including a communication interface and a memory device coupled to a processing circuit. The communication interface adapted for communicating with a transmitter device. The memory device adapted to store a protocol stack associated with transmissions over the communication interface. For instance, the communication interface may include a wireless transceiver circuit adapted for wireless communications. The processing circuit may be adapted to (a) receive a block acknowledgement retransmission policy (BARP) frame that individually identifies a retransmission policy for each frame in a block of frames; and/or (b) receive frames from the block of frames. The block of frames may be received at a data link layer of the protocol stack. The processing circuit may send the received frames to a higher layer of a protocol stack if all frames that have been identified for retransmission in the BARP frame have been received. It may also send a block acknowledgment indicating missing frames that should be retransmitted based on the BARP frame. In response, the receiver device may receive the missing frames which the BARP frame identified for retransmission.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Overview

One feature provides a Block Acknowledgement Retransmission Policy (BARP) frame that permits a transmitter to define a retransmission policy on a per-frame basis (i.e., frame by frame basis) for frames transmitted in a block of frames. The BARP frame allows the receiver to know which frames will be retransmitted and which frames will not be retransmitted.

Exemplary Network Operating Environment

Figure 1:
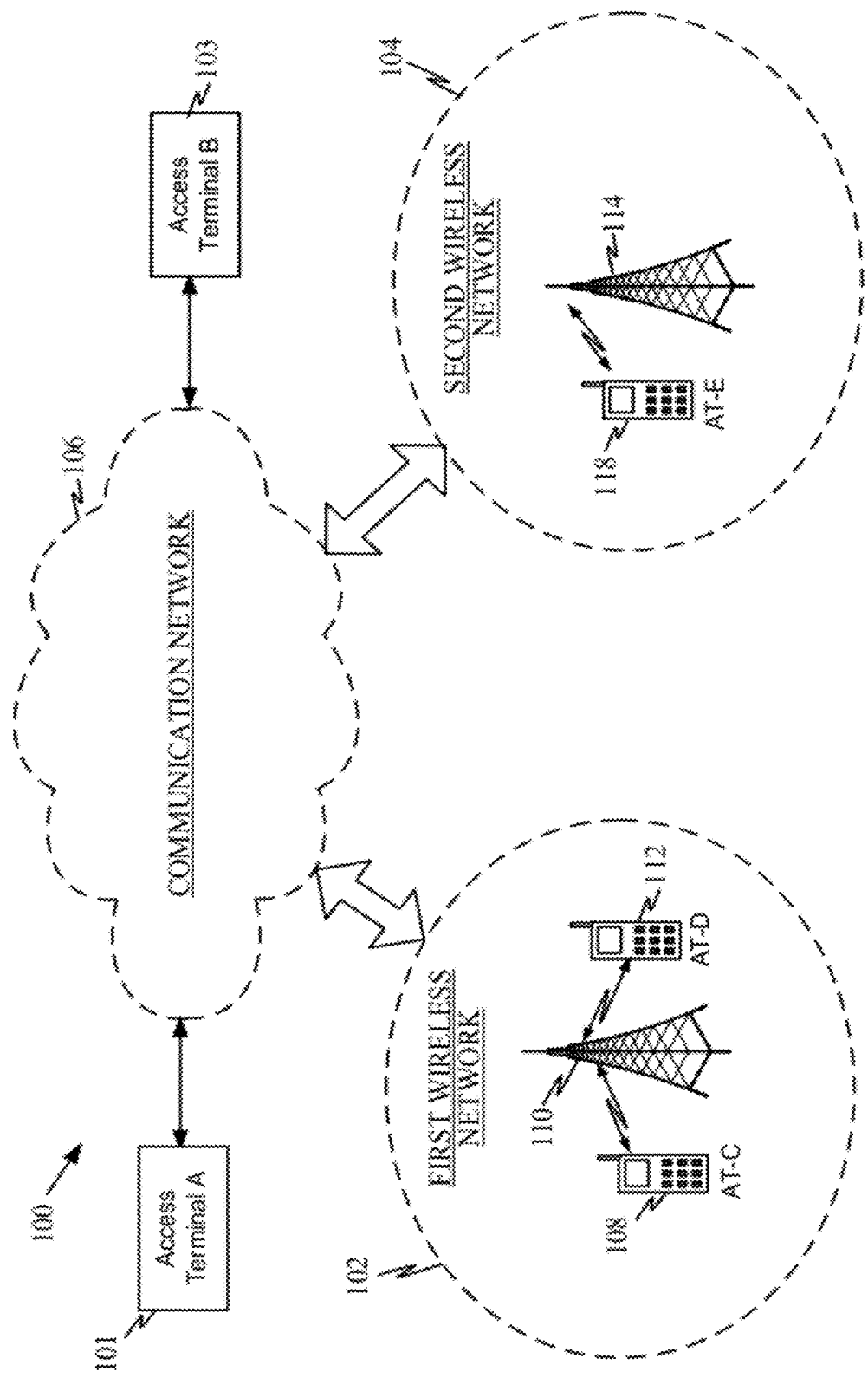
FIG. 1 is a diagram illustrating an exemplary network environment 100 in which a per-frame retransmission policy may be implemented for transmissions.

FIG. 1 is a diagram illustrating an exemplary network environment 100 in which a per-frame retransmission policy may be implemented for transmissions. Here, it is illustrated that various networks 102, 104, and 106 may be interconnected to allow devices operating on such networks to communicate with each other. For example, communications or transmissions may occur between a first access terminal 101 and a second access terminal 103 over a communication network 106. Additionally, a third access terminal 108 may communicate with any of the other access terminals 101, 103, 112, and/or 118 over one or more networks 102, 104 and/or 106. Some of the networks 102 and 104 may be wireless networks while other networks 106 may be wired networks.

Figure 2:
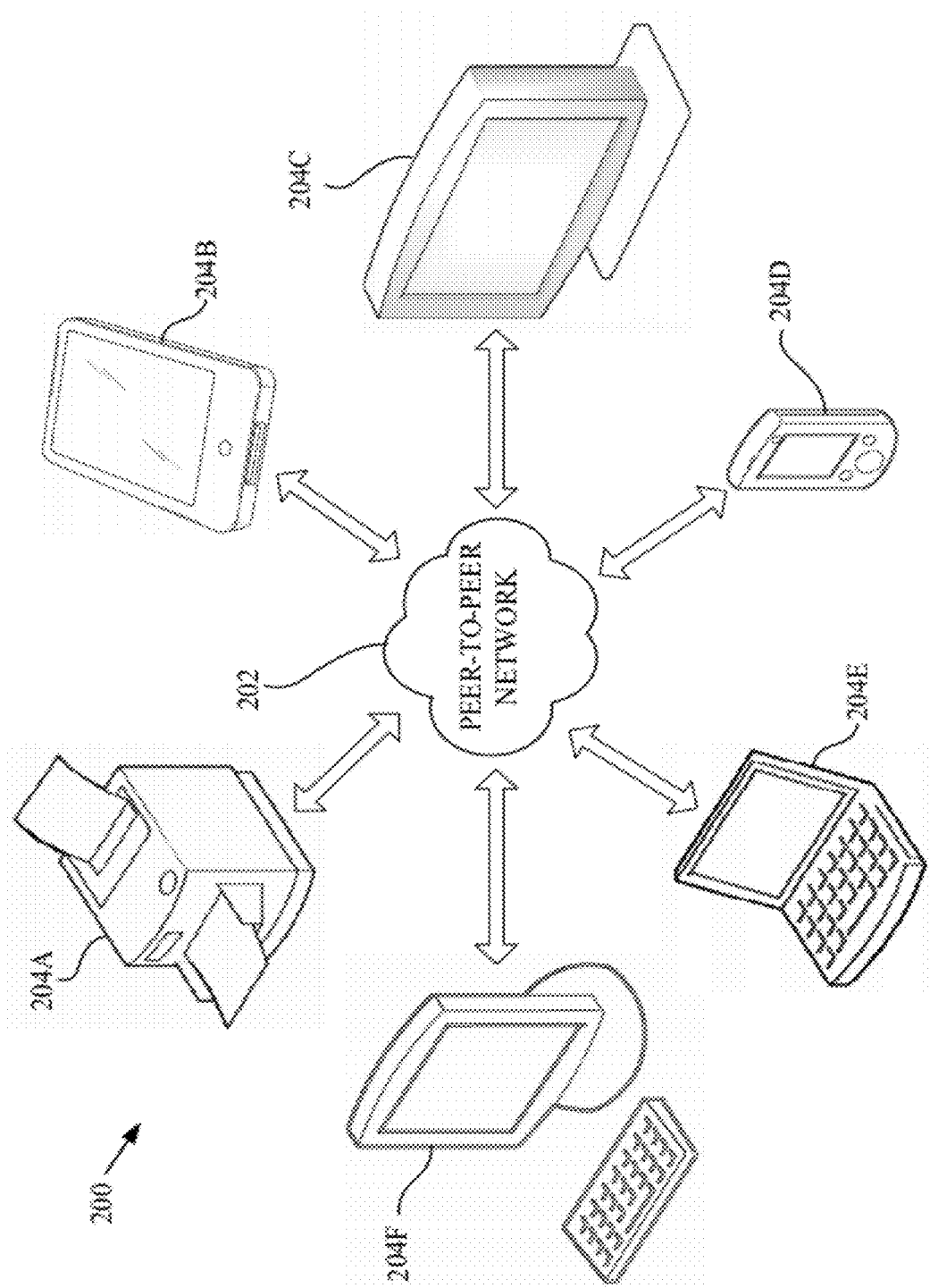
FIG. 2 is a diagram illustrating an exemplary peer-to-peer network environment in which a per-frame retransmission policy may be implemented for transmissions.

FIG. 2 is a diagram illustrating an exemplary peer-to-peer network environment 200 in which a per-frame retransmission policy may be implemented for transmissions. The peer-to-peer network environment 200 may include a peer-to-peer network 202 and a plurality of peer nodes 204A-204F. The peer-to-peer network 202 may be decentralized and/or distributed such that it is not centrally coordinated by servers or stable hosts. For example, the peer-to-peer network 202 can be implemented to operate at the highest layer of a communication protocol stack (e.g., the application layer). Such peer-to-peer network 202 may utilize any type of underlying network, such as an Internet Protocol network, to allow a plurality of peer nodes 204A-204F on the overlay network 202 to communicate with each other. The underlying network may comprise any number of types of networks, such as Wide Area Networks (WAN), Local Area Networks (LAN), wireless networks (e.g., WWAN, WLAN) and/or any other type of network. Peer nodes 204A-204F may include devices adapted to communicate via the peer-to-peer network 202. By way of example and not limitation, peer nodes may include devices such as printers 204A, tablet computers 204B, televisions 204C, mobile phone, personal digital assistants, and personal media players 204D, laptop and notebook computers 204E, and/or desktop computers 204F.

Figure 3:
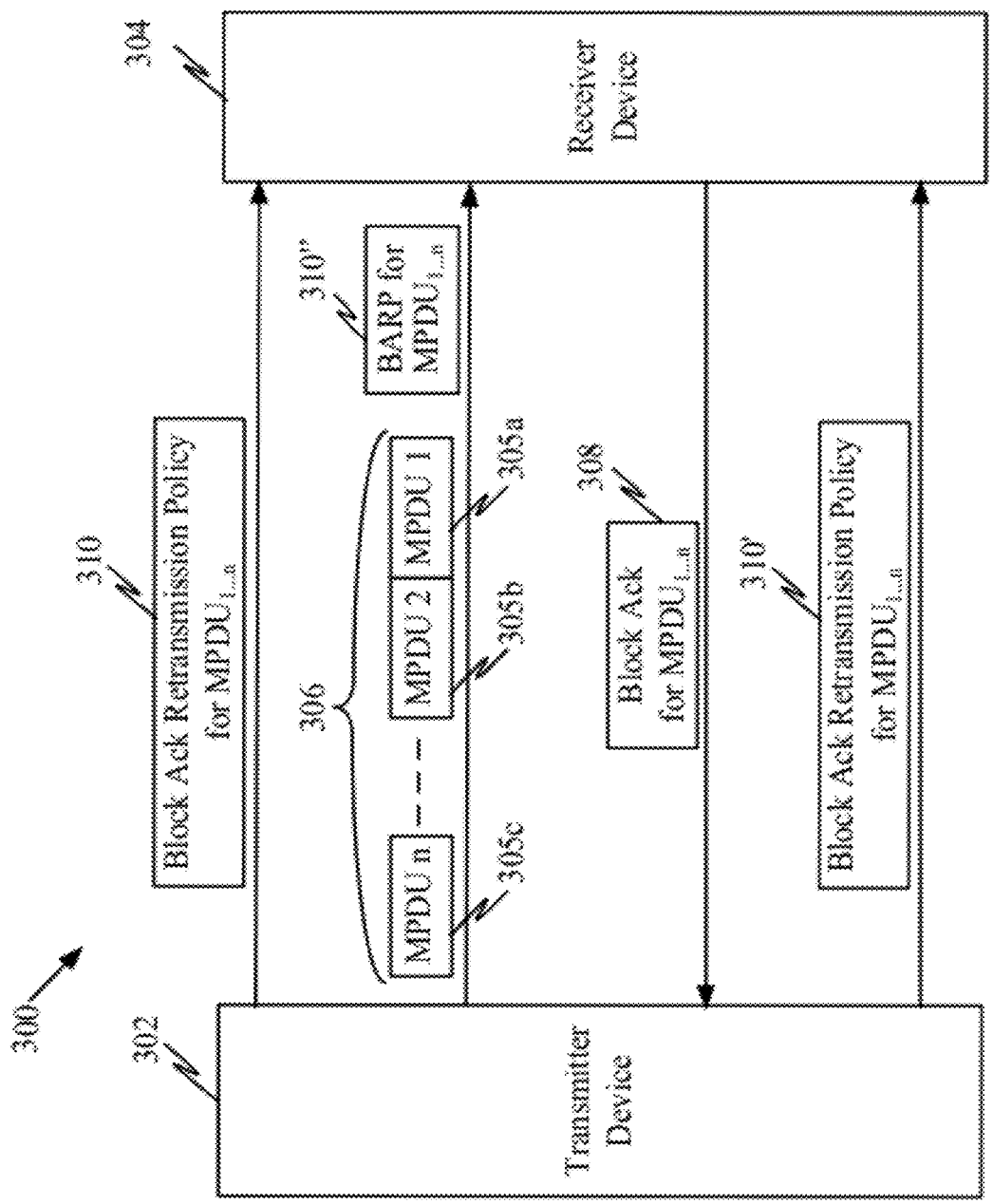
FIG. 3 illustrates a communication system in which a transmitter device sends a data stream that includes a block of frames to a receiver device.

FIG. 3 illustrates a communication system 300 in which a transmitter device 302 sends a data stream that includes a block of frames 306 to a receiver device 304. In one example, the block of frames 306 may include a plurality of data units (e.g., each data unit corresponding to a frame), such as Media Access Control (MAC) Protocol Data Units (MPDUs) 305a, 305b, and 305c, for example. For purposes of illustration, the transmitter device 302 and/or receiver device 304 may be any of the access terminals and/or peer nodes illustrated in FIGS. 1 and/or 2 or other devices with transmission and/or reception capabilities. Therefore, transmissions between the transmitter device 302 and the receiver device 304 may be over a wired or wireless medium. In various implementations, the transmissions may be directly between the transmitter device 302 and the receiver device 304 or they may be via one or more intermediate devices and/or networks. Upon receipt of the block of frames 306, the receiver device 304 may send a Block Ack (BA) 108 indicating (e.g., using a bitmap) which frames were correctly received.

Figure 4:
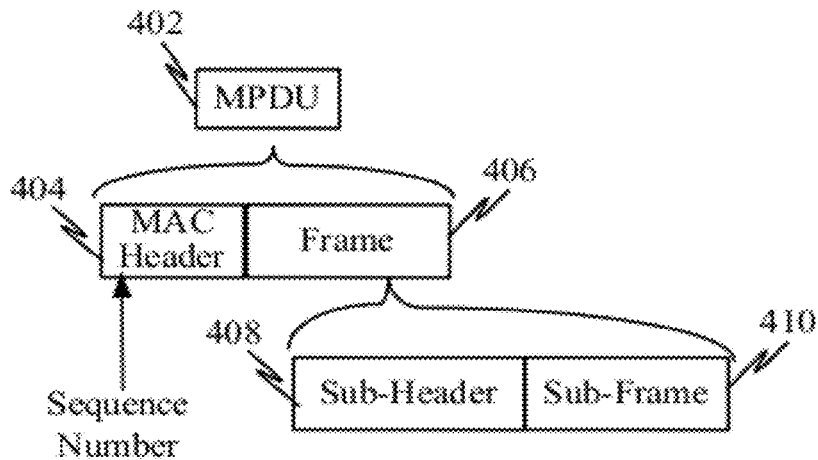
FIG. 4 illustrates an example of an MPDU which may encapsulate a MAC header plus a payload frame.

FIG. 4 illustrates an example of an MPDU 402 which may encapsulate a MAC header 404 plus a payload frame 406. Multiple encapsulations may be possible, where each frame may encapsulate a header and payload frame for a higher layer of a protocol stack. For instance, the frame 406 may encapsulate a sub-header 408 and sub-frame 410. In one example, the frame 406 may encapsulate an Internet Protocol (IP) packet. Additionally, the MAC header 404 may include a sequence number identifying the sequence number of each MPDU 402.

Referring again to FIG. 3, in order to differentiate the between frames in the same block, one feature provides the definition and use of a Block Acknowledgment Retransmission Policy (BARP) 310 and 310' frame. The BARP may be sent by the transmitter device 302 to the receiver device 304 before (e.g., BARP 310) and/or together with (e.g. BARP 310") and/or after (e.g., BARP 310') transmission of the frames 306 and/or BA 308.

The retransmission policy of a particular MPDU may be identified based on a Differentiated Services Code Point (DSCP) field of an Internet Protocol (IP) packet within the payload frame of each MPDU. Differentiated Services (DiffServ, Internet Engineering Task Force (IETF) Request for Comments (RFC) 2475) is a computer networking architecture that specifies a simple, scalable and coarse-grained mechanism for classifying, managing network traffic and providing Quality of Service (QoS) guarantees on modern IP networks. DiffServ can, for example, be used to provide low-latency, guaranteed service (GS) to critical network traffic such as voice or video while providing simple best-effort traffic guarantees to non-critical services such as web traffic or file transfers. (See RFC 2475 on Differentiated Services). DiffServ uses the 6-bit Differentiated Services Code Point (DSCP) field in the header of IP packets for packet classification purposes. In one example, the sub-header 408 (FIG. 4) may include the DSCP for the MPDU 402. The DSCP mapping may be determined by the application generating the IP packet contained in the MPDU. Additionally or alternatively, the media access control layer of a protocol stack may also inspect each MAC Layer Service Data Unit (MSDU) within an MPDU to establish or ascertain a retransmission policy based on higher layer protocol information.

Figure 5:
FIG. 5 illustrates an Open System Interconnection (OSI) model that may be implemented as part of a protocol stack used by a device (e.g., transmitter and/or receiver) for communications.

FIG. 5 illustrates an Open System Interconnection (OSI) model 502 that may be implemented as part of a protocol stack used by a device (e.g., transmitter and/or receiver) for communications. Here, content/data from the higher layers of a protocol stack (e.g., host layers) may be encapsulated within the lower layers (e.g., media layers). In one example, the Media Access Control (MAC) Protocol Data Units (MPDUs) may be generated at the Data Link Layer and may encapsulate Application Layer, Presentation Layer, Session Layer, Transport Layer, and/or Network Layer data. A transmitter and/or receiver may implement a protocol stack based on this OSI model 502.

A Protocol Data Unit (PDU) describes or includes data and its overhead at a particular layer of a protocol stack. Each layer of a protocol stack may have a unique PDU. At the transmitter device, as data is sent down the protocol stack, it is encapsulated at each layer by adding a header and possibly a trailer. At the receiver device, data is decapsulated as it goes back up the protocol stack. For example, as illustrated in FIG. 5, a transport layer PDU is known as a segment, a network layer PDU is known as packet or datagram, a data link layer PDU is known as a frame and a physical layer PDU is known as bits.

Block Ack Retransmission Policy (BARP) Frame

In order to provide a differentiated retransmission policy within a block of frames, a Block Acknowledgement Retransmission Policy (BARP) frame may be defined, used, and/or sent from the transmitter device 302 to the receiver device 304 (FIG. 3).

Figure 6:
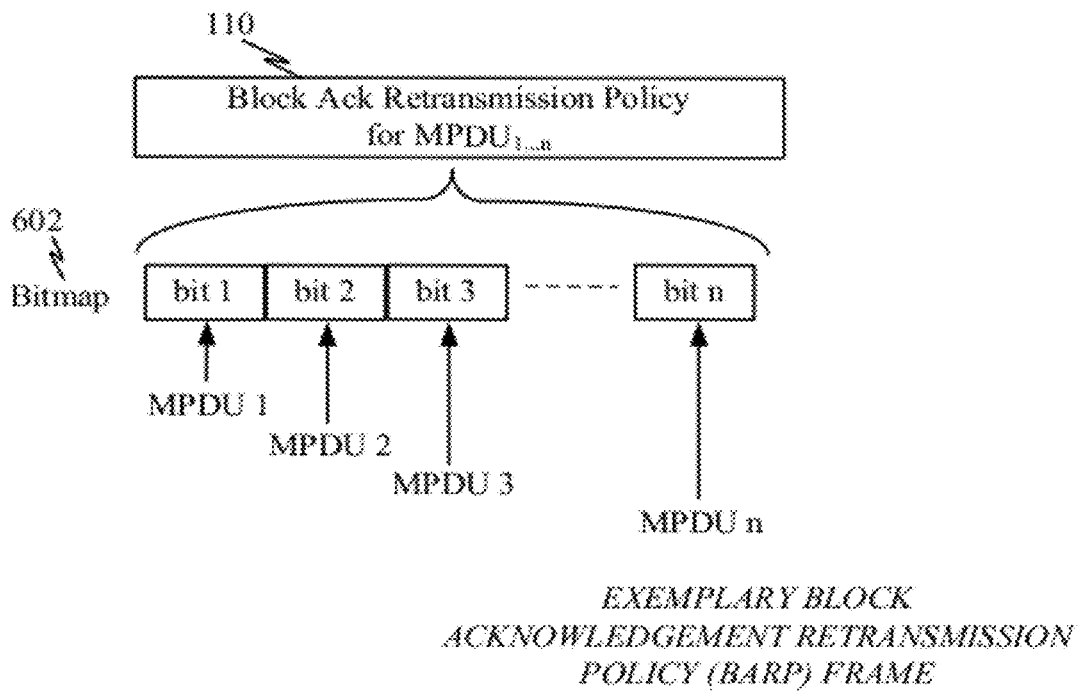
FIG. 6 illustrates an example of a Block Acknowledgement Retransmission Policy bitmap that could be included in a BARP frame.

FIG. 6 illustrates an example of a Block Acknowledgement Retransmission Policy bitmap that could be included in a BARP frame. Each bit in the bitmap 602 may indicate whether the corresponding MPDU will be retransmitted or not, in case of a non-acknowledgement of that MPDU. For instance, bit 1 may correspond to MPDU 1, bit 2 may correspond to MPDU 2, and so on. When a certain frame sequence number is missing at the receiver device for which a prior retransmission bitmap indicated that this sequence number will not be retransmitted, then the receiver device may continue to forward further sequence numbers up the MAC Service Access Point (SAP) (e.g., to higher layers of the protocol stack) without waiting for the missing sequence number to be retransmitted and received. The transmitter device 302 (FIG. 3) may send the BARP frame to the receiver device 304 to provide a differentiated retransmission policy for frames within a single Block Ack agreement. The BARP frame 310 (FIG. 3) may be periodically or asynchronously sent by the transmitter to indicate to the receiver 104 which sequence numbers (of frames) will be retransmitted and which will not. In one example, the BARP 310 (FIG. 3) may include a retransmission bitmap 602 (FIG. 6) that indicates whether a specific MPDU will be retransmitted or not.

Currently, when a frame is missing, the receiver does not forward further sequence numbers up the MAC SAP until the missing sequence number is received or until the transmitter purges the sequence number by sending a Block Acknowledgement Retransmission (BAR) frame. However, the BAR frame only indicates to purge up a certain sequence number (e.g., purge frames up to sequence number n). By contrast, the BARP frame 310 (e.g., retransmission bitmap 602) defines a retransmission policy on a per frame (MPDU) basis, thereby allowing purging of individual sequence numbers.

The transmitter device may ensure that it does not transmit frames having sequence numbers for which no BARP frame has been sent to the receiver device yet. When a receiver device receives a frame having a sequence number for which it has received no retransmission policy yet, it may assume that the particular frame with that sequence number will be retransmitted, until a retransmission policy is received which indicates otherwise.

Figure 7:
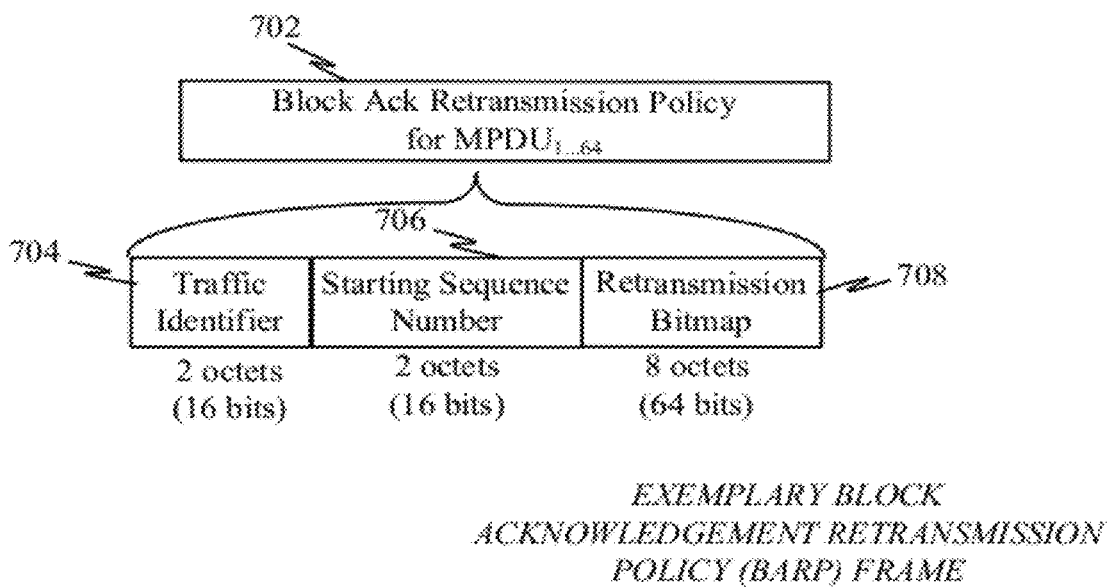
FIG. 7 illustrates one exemplary implementation of a BARP frame body.

FIG. 7 illustrates one exemplary implementation of a BARP frame body 702. Here, the BARP frame body 702 includes a Traffic Identifier field 704, a Starting Sequence Number field 706, and a Retransmission Policy Bitmap field 708. The Traffic Identifier field 704 indicates the Traffic Identifier (TID) of the related data flow and Block Ack agreement. The Starting Sequence Number field 706 indicates the sequence number corresponding to the first bit in the Retransmission Bitmap field 708. The Retransmission Bitmap field 708 is a bitmap that indicates for each subsequent sequence number whether the frame will be retransmitted (1) or not (0). That is, starting with the sequence number (in the Starting Sequence Number field 706) associated with a frame corresponding to the first bit in the bitmap, each subsequent bit in the bitmap 708 may corresponds to a sequentially incremented sequence number for sequential frames. Thus, the bitmap 708 that allows to individually signal (per individual sequence number) whether a frame will be retransmitted or not.

In various implementations, the BARP frame body 702 may be included in a Control frame, a Management frame, and/or an Action frame. When encapsulated as an Action frame, the BARP frame 702 may be aggregated in an A-MPDU as an Action No Ack frame, so that no Short Inter Frame Space (SIPS) response will be elicited.

Retransmission policy information for multiple TIDs may be included inside a single BARP frame by repeating the three fields shown in FIG. 7 for other TIDs. Such a frame may be referred to as Multi-TID BARP frame.

In some implementations, a transmitter device may send a first BARP frame (associated with a first TID and first Starting sequence number) to a receiver device to indicate that a frame with a certain sequence number will be retransmitted, while a subsequent BARP frame may be sent by the transmitter device to indicate that the same frame will not be transmitted or retransmitted. When a BARP frame indicates that a frame will not be retransmitted, then all subsequent BARP frames may indicate that it will not be retransmitted.

When a received BARP frame indicates that a sequence number will not be transmitted or retransmitted, then the receiver device may skip that sequence number when a frame with a higher sequence number is received. Skipping a sequence number means that the frame is not forwarded to the MAC SAP and that forwarding is continued with a higher sequence number. The retransmission policy allows for selective retransmission of frames according to their relevance to the receiver device or traffic flow.

Frames may also be discarded from a waiting queue at the transmitter device without being transmitted at all. For instance, when the throughput on a wireless link between a transmitter device and a receiver device suddenly drops (which could be a temporary condition), frames in the transmitter queue may be discarded prior to transmission. When such discarded/dropped frames have already been assigned a sequence number, a BARP frame may be transmitted to signal to the receiver device(s) that the sequence number will not be transmitted by setting the corresponding retransmission bit to 0, so that the receiver device will not wait for these frames. When the non-transmitted/discarded frames had not been assigned a sequence number yet, then no BARP frame needs to be transmitted.

Thus, a BARP frame may be used in several scenarios. In a first scenario, the BARP frame may be used where all frames in a block of frames are transmitted at least once, but only a subset of the frames are to be retransmitted if lost. By avoiding retransmission of certain frames, this may allow fitting the remaining frames within an available bandwidth. This scenario works well where some fraction of transmitted frames is not lost and the majority of frames can occasionally be omitted. Also, frame loss often occurs in peaks, such that the important frames can be retransmitted while the less important frame can be skipped. In a second scenario, the BARP frame may be used to discard a frame with a sequence number without transmitting the frame at all.

A BARP frame may be transmitted periodically or asynchronously or incidentally. According to various implementations, a BARP frame may be sent as a separate frame, transmitted as part of an aggregated MPDU (A-MPDU), and/or included with every A-MPDU. A BARP frame may also be sent once per set of buffered frames. A BARP frame may be transmitted in advance to indicate which sequence numbers will be transmitted and which will not in a subsequent transmission of frames (e.g., MPDUs).

Generally, a retransmission policy specified by the BARP frame may define which frames in the block of frames are to be retransmitted and which frames are not to be retransmitted. Note that, in some examples the block of frames may include both high-reliability frames and low-reliability frames, where high-reliability frames are defined for retransmission and low-reliability frames are defined for no retransmission. For instance, frames including Transmission Control Protocol (TCP) data loads may be sent over high-reliability frames while User Datagram Protocol (UDP) data loads may be sent over low-reliability frames. In another example, frames that require acknowledgement by their sender are identified for retransmission by the BARP frame while frames that do not require acknowledgement by their sender are identified for no retransmission by the BARP frame.

Note that the transmitter device 302 (FIG. 3) and receiver device 304 may be communicating directly with each other or through interim devices over a network. For instance, the transmitter device 302 may be an interim point between one or more senders of content in the frames in the block of frames and the receiver device 304. In another example, the receiver device 304 may be communicating with a plurality of senders over the transmitter device 302. Consequently, the block of frames may include frames containing content from a plurality of different senders, where high-reliability content is sent over frames designated for retransmission.

Exemplary Transmitter Device

Figure 8:
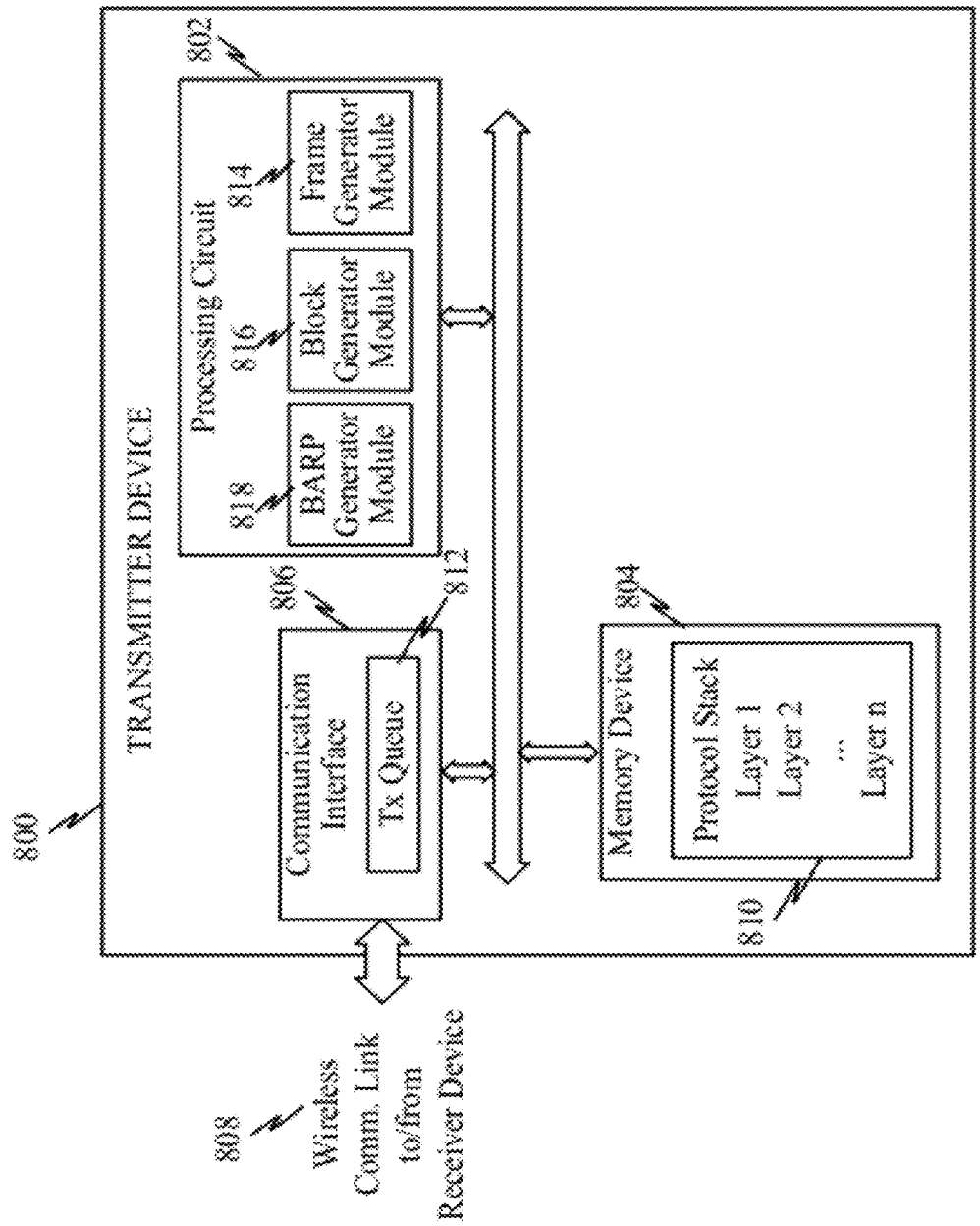
FIG. 8 illustrates a block diagram of a transmitter device according to one example.

FIG. 8 illustrates a block diagram of a transmitter device 800 according to one example. The transmitter device 800 may include a processing circuit (e.g., a processor, processing module, etc.) 802, a memory device 804, and a communication interface 806. The processing circuit 802 may be communicatively coupled to the memory device 804 and communication interface 806 to transmit and/or receive data to/from a receiver device over a wireless communication link 808. In one example, the communication interface may comprise a transmitter circuit and/or receiver circuit (e.g., a transceiver or modem device) adapted for wireless communications with a receiver device. The memory device 804 may implement a multi-layered protocol stack 810 and the communication interface 806 may implement a transmission queue 812.

In one example, the processing circuit 802 may implement a frame generator module/circuit 814, a block generator module/circuit 816, and/or a block acknowledgement retransmission policy (BARP) generator module/circuit 818. The frame generator module/circuit 814 may encapsulate data within a frame, where each frame may be individually identified by a sequence number. The block generator module/circuit 816 may combine or encapsulate a plurality of frames as a block. The BARP generator module/circuit 818 may serve to generate a block acknowledgement retransmission policy (BARP) associated with past, present, and/or future frames transmitted within a block, where the BARP may individually identify a retransmission policy for each frame in a block of frames.

According to one implementation, the transmitter device 800 may be configured to transmit a data stream to a receiver device over the wireless communication link 808. The data stream may comprise a block of frames, where each frame may be identified by a sequence number. The data stream may comprise a block of frames (e.g., generated by the block generator module/circuit 816), where each frame (e.g., generated by the frame generator module/circuit 814) may be identified by a sequence number. The transmitter device 800 may also be adapted to generate and transmit a Block Acknowledgement Retransmission Policy (BARP) frame (e.g., generated by the BARP generator module/circuit 818) that individually identifies which frames in a block will or will not be retransmitted by the transmitter device 800. Such information may assist a receiver device in determining whether non-receipt of some frames in the block warrants waiting for those missing frames to be received or not.

Figure 9:
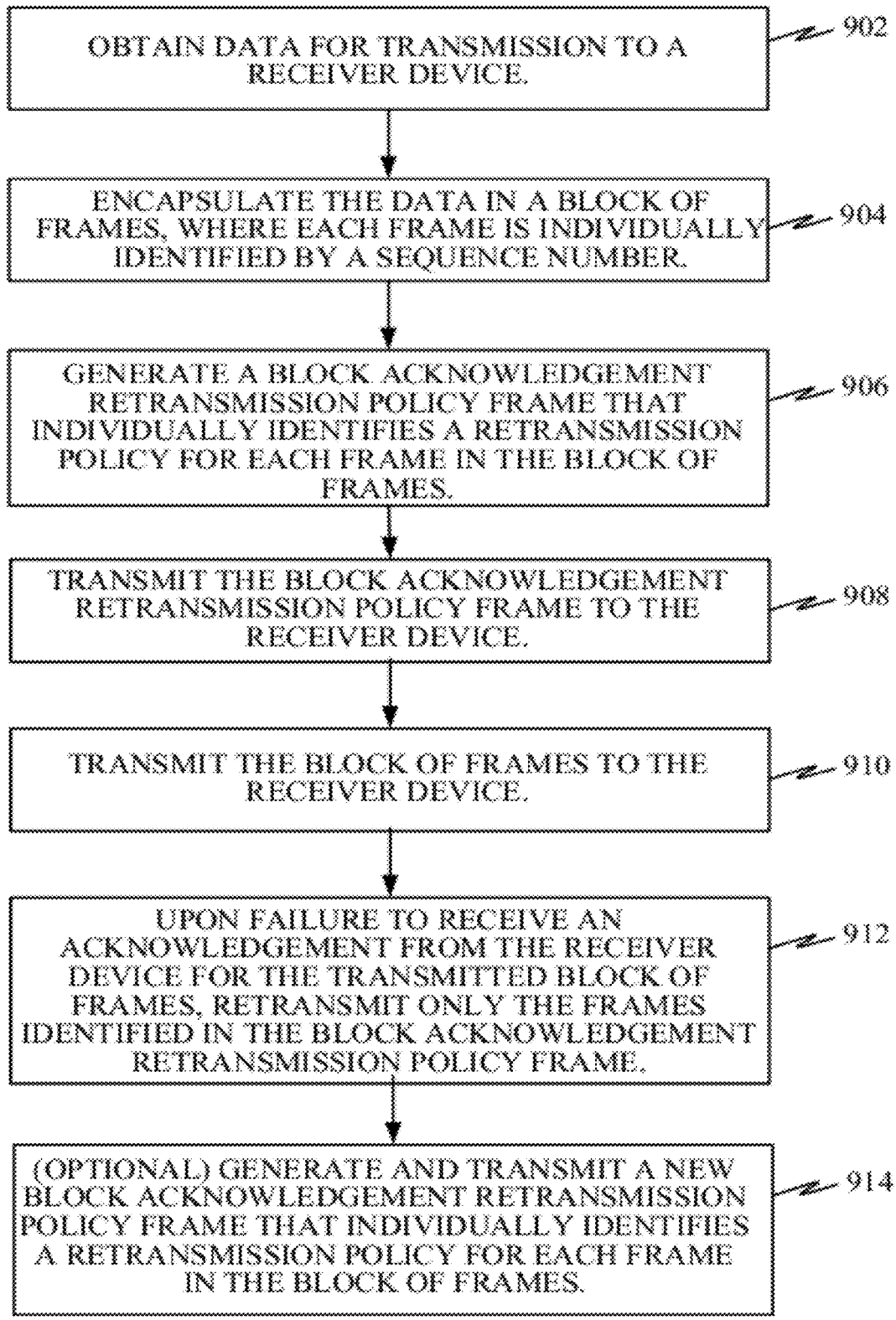
FIG. 9 is a flow diagram illustrating a method operational at a transmitter device to implement a Block Acknowledgement Retransmission Policy (BARP) frame.

FIG. 9 is a flow diagram illustrating a method operational at a transmitter device to implement a Block Acknowledgement Retransmission Policy (BARP) frame. The transmitter device may obtain data for (wireless) transmission to a receiver device 902. The transmitter device may then encapsulate the data as part of a block of frames, where each frame may be individually identified by a sequence number 904. For example, the data may be encapsulated at multiples levels of a protocol stack. The transmitter device may then generate a block acknowledgement retransmission policy (BARP) frame that individually identifies a retransmission policy for each frame in the block of frames 906. The block acknowledgement retransmission policy frame may then be transmitted to the receiver device 908. The block of frames may then be transmitted to the receiver device 910. Upon failure to receive an acknowledgement from the receiver device for the transmitted block of frames, the transmitter device may retransmit only the frames identified in the block acknowledgement retransmission policy frame 912. Optionally, at a subsequent time, the transmitter device may generate and transmit a new block acknowledgement retransmission policy frame that individually identifies a retransmission policy for each frame in the block of frames 914.

Exemplary Receiver Device

Figure 10:
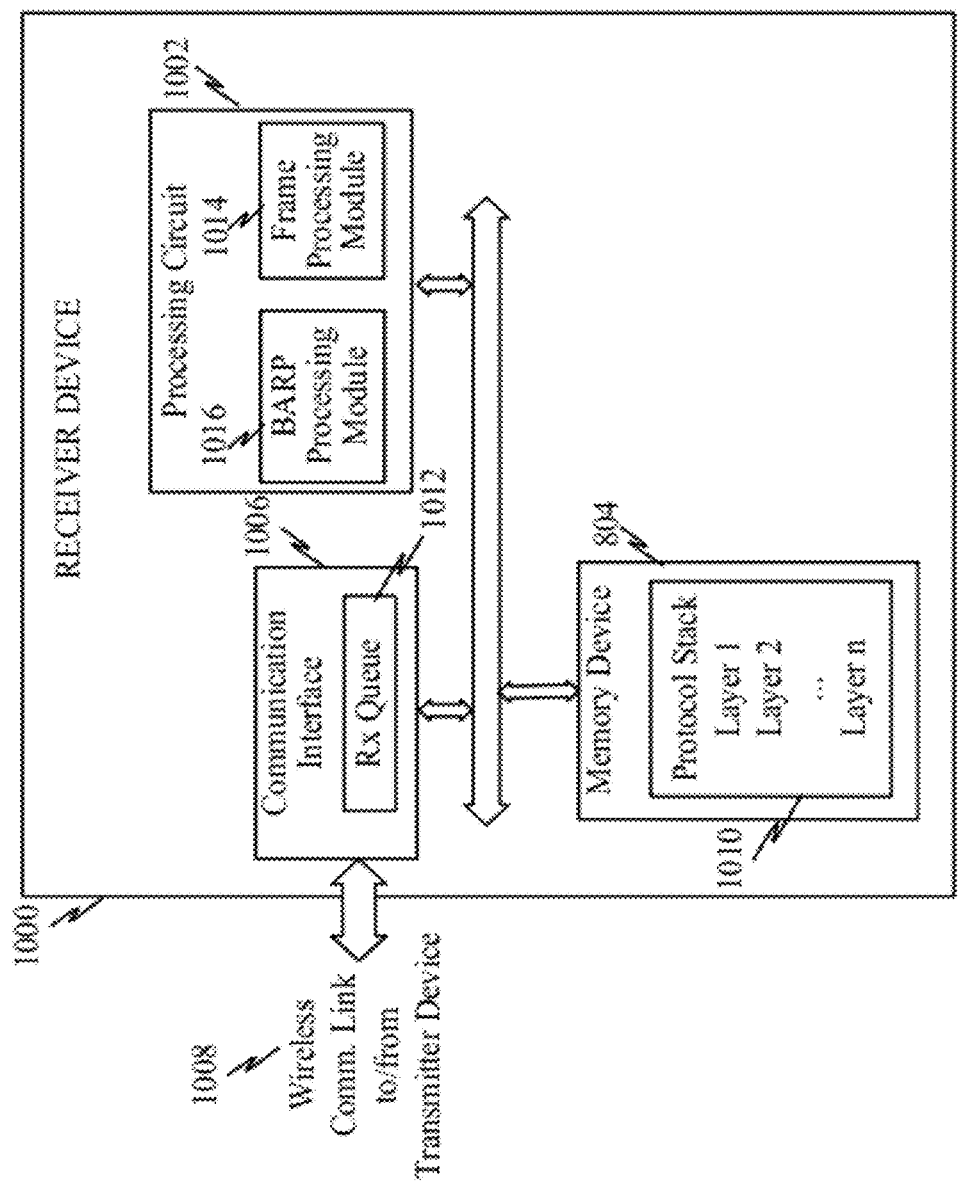
FIG. 10 illustrates a block diagram of a receiver device according to one example.

FIG. 10 illustrates a block diagram of a receiver device 1000 according to one example. The receiver device 1000 may include a processing circuit (e.g., a processor, processing module, etc.) 1002, a memory device 1004, and a communication interface 1006. The processing circuit 802 may be communicatively coupled to the memory device 1004 and communication interface 1006 to receive and/or transmit data (e.g., within frames in a block of frames) from/to a transmitter device over a wireless communication link 1008. The memory device 1004 may implement a multi-layered protocol stack 1010 and the communication interface 1006 may implement a receiver queue 1012.

In one example, the processing circuit 1002 may include or implement a frame processing module/circuit 1014 to process received frames within a block of frames that may be received and held by the receiver queue 1012. The processing circuit 1002 may also include or implement a BARP processing module/circuit 1016 to process a received BARP frame in order to ascertain the retransmission policy defined for frames to be received or already received and process the frames accordingly.

Figure 11:
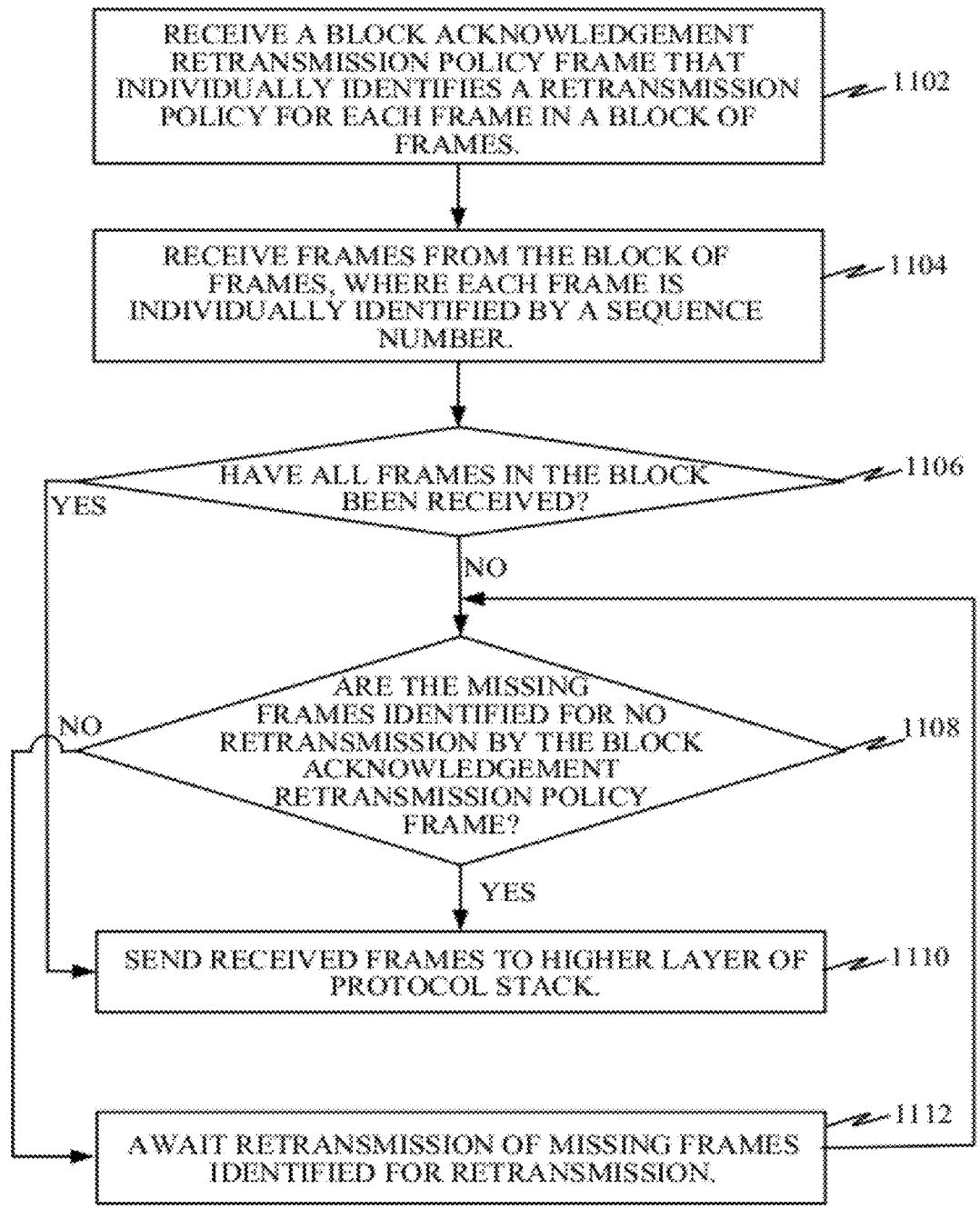
FIG. 11 is a flow diagram illustrating a method operational at a receiver device to implement a Block Acknowledgement Retransmission Policy (BARP) frame.

FIG. 11 is a flow diagram illustrating a method operational at a receiver device to implement a Block Acknowledgement Retransmission Policy (BARP) frame. The receiver device may receive a block acknowledgement retransmission policy (BARP) frame that individually identifies a retransmission policy for each frame in a block of frames 1102. Subsequently and/or prior to the reception of the BARP frame, the receiver device may receive frames from the block of frames, where each frame is individually identified by a sequence number 1104. If all frames in the block been received 906, then the send received frames to higher layer of a protocol stack (e.g., MAC Service Access Point (SAP)) 1110. Otherwise, the receiver device may identify whether the missing frames are identified for no retransmission by the block acknowledgement retransmission policy frame 1108. If yes, then the received frames are sent to the higher layer of the receiver device protocol stack 1110. If not, the receiver device awaits retransmission of missing frames identified for retransmission 1112.

It should be recognized that, generally, most of the processing described in this disclosure may be implemented in a similar fashion. Any of the circuit(s) or circuit sections may be implemented alone or in combination as part of an integrated circuit with one or more processors. The one or more of the circuits may be implemented on an integrated circuit, an Advance RISC Machine (ARM) processor, a digital signal processor (DSP), a general purpose processor, etc.

One or more of the components, steps, features and/or functions illustrated in FIGS. 1, 2, 3, 4, 5, 6, 7, 8, 9, 10 and/or 11 may be rearranged and/or combined into a single component, step, feature or function or embodied in several components, steps, or functions. Additional elements, components, steps, and/or functions may also be added without departing from the present disclosure. The apparatus, devices, and/or components illustrated in FIGS. 1, 2, 3, 8 and/or 10 may be configured to perform one or more of the methods, features, or steps described with reference to FIGS. 4, 5, 6, 7, 9 and/or 11. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

A processing circuit, as described herein (e.g., processing circuits 802 and/or 1002), may comprise circuitry configured to implement desired programming provided by appropriate media in at least one embodiment. For example, a processing circuit may be implemented as one or more of a processor, a controller, a plurality of processors and/or other structure configured to execute executable instructions including, for example, software and/or firmware instructions, and/or hardware circuitry. Embodiments of a processing circuit may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor but, in the alternative, the processor may be any conventional processor, controller, microcontroller, or state machine. A processor may also be implemented as a combination of computing components, such as a combination of a DSP and a microprocessor, a number of microprocessors, one or more microprocessors in conjunction with a DSP core, or any other such configuration. These examples of the processing circuit are for illustration and other suitable configurations within the scope of the present disclosure are also contemplated.

As described herein above, memory circuit, such as memory circuits 804 and/or 1004, may represent one or more devices for storing programming and/or data, such as processor executable code or instructions (e.g., software, firmware), electronic data, databases, or other digital information. A memory circuit may be any available media that can be accessed by a general purpose or special purpose processor. By way of example and not limitation, memory circuit may include read-only memory (e.g., ROM, EPROM, EEPROM), random access memory (RAM), magnetic disk storage mediums, optical storage mediums, flash memory devices, and/or other non-transitory computer-readable mediums for storing information.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the disclosure described herein can be implemented in different systems without departing from the disclosure. It should be noted that the foregoing embodiments are merely examples and are not to be construed as limiting the disclosure. The description of the embodiments is intended to be illustrative, and not to limit the scope of the disclosure. As such, the present teachings can be readily applied to other types of apparatuses and many alternatives, modifications, and variations will be apparent to those skilled in the art.

What is claimed is:

1. A method operational on a transmitter device, comprising:
    assigning a sequence number to each frame in a block of frames;
    discarding one or more frames in the block of frames;
    generating a block acknowledgement retransmission policy (BARP) frame that individually identifies a retransmission policy for each frame in the block of frames, wherein:
        the BARP frame comprises a traffic identifier, a starting sequence number, and a retransmission bitmap,
        the traffic identifier identifies a related data flow and block ack agreement,
        the starting sequence number indicates a sequence number corresponding to a frame associated with a first bit in the retransmission bitmap, and
        each bit in the retransmission bitmap indicates whether a corresponding frame will be retransmitted in case of non-acknowledgment of that frame or that a discarded frame will not be transmitted;
    transmitting the BARP frame to a receiver device separate from the block of frames; and
    transmitting non-discarded frames in the block of frames to the receiver.

2. The method of claim 1, further comprising:
    encapsulating data in the block of frames, wherein each frame is individually identified by a sequence number.

3. The method of claim 1, wherein transmission of the BARP frame precedes transmission of the block of frames.

4. The method of claim 1, wherein transmission of the block of frames precedes transmission of the BARP frame.

5. The method of claim 1, wherein the BARP frame indicates which frames in the block of frames are to be retransmitted and which frames are not to be retransmitted.

6. The method of claim 1, wherein the block of frames includes both high-reliability frames and low-reliability frames.

7. The method of claim 6, wherein high-reliability frames are defined for retransmission and low-reliability frames are defined for no retransmission.

8. The method of claim 1, wherein a retransmission policy specified by the BARP frame defines which frames in the block of frames are to be retransmitted and which frames are not to be retransmitted.

9. The method of claim 1, wherein frames that require acknowledgement by their sender are identified for retransmission by the BARP frame.

10. The method of claim 1, wherein frames that do not require acknowledgement by their sender are identified for no retransmission by the BARP frame.

11. The method of claim 1, further comprising:
    retransmitting only those frames identified for retransmission in the BARP frame.

12. The method of claim 1, further comprising:
    receiving a block acknowledgement from the receiver device indicating which, if any, of the frames in the block were not received; and
    retransmitting only those missing frames identified for retransmission in the BARP frame.

13. The method of claim 1, further comprising:
    generating and transmitting a new BARP frame after transmission of the block of frames.

14. The method of claim 1, wherein the BARP frame is transmitted periodically or asynchronously or incidentally.

15. The method of claim 1, wherein the BARP frame is transmitted as part of an aggregated Media Access Control (MAC) Protocol Data Unit (MPDU).

16. The method of claim 1, wherein the transmitter device is an interim point between one or more senders of content in the frames in the block of frames and the receiver device.

17. The method of claim 1, wherein the block of frames includes frames containing content from a plurality of different senders, where high-reliability content is sent over frames designated for retransmission.

18. The method of claim 1, wherein the one or more frames in the block of frames are discarded when throughput on a wireless link drops.

19. The method of claim 1, wherein the BARP frame comprises more than one traffic identifier, starting sequence number, and retransmission bitmap.

20. A transmitter device, comprising:
    a communication interface for communicating with a receiver device;
    a processing circuit coupled to the communication interface, the processing circuit adapted to:
        assign a sequence number to each frame in a block of frames;
        discard one or more frames in the block of frames;
        generate a block acknowledgement retransmission policy (BARP) frame that individually identifies a retransmission policy for each frame in the block of frames, wherein:
            the BARP frame comprises a traffic identifier, a starting sequence number, and a retransmission bitmap,
            the traffic identifier identifies a related data flow and block ack agreement,
            the starting sequence number indicates a sequence number corresponding to a frame associated with a first bit in the retransmission bitmap, and
            each bit in the retransmission bitmap indicates whether a corresponding frame will be retransmitted in case of non-acknowledgment of that frame or that a discarded frame will not be transmitted;
        transmit the BARP frame to the receiver device separate from the block of frames; and
        transmit non-discarded frames in the block of frames to the receiver.

21. The transmitter device of claim 20, wherein the communication interface includes a wireless transceiver circuit adapted for wireless communications.

22. The transmitter device of claim 20, further comprising:

a memory device for storing a protocol stack associated with transmissions over the communication interface.

23. The transmitter device of claim 20, wherein the processing circuit is further adapted to:
encapsulate data in the block of frames, where each frame is individually identified by a sequence number.

24. The transmitter device of claim 20, wherein the block of frames is formed at a data link layer of a protocol stack.

25. The transmitter device of claim 20, wherein transmission of the BARP frame precedes transmission of the block of frames.

26. The transmitter device of claim 20, wherein transmission of the block of frames precedes transmission of the BARP frame.

27. A transmitter device, comprising:
means for assigning a sequence number to each frame in a block of frames;
means for discarding one or more frames in the block of frames;
means for generating a block acknowledgement retransmission policy (BARP) frame that individually identifies a retransmission policy for each frame in a block of frames, wherein:
the BARP frame comprises a traffic identifier, a starting sequence number, and a retransmission bitmap,
the traffic identifier identifies a related data flow and block ack agreement,
the starting sequence number indicates a sequence number corresponding to a frame associated with a first bit in the retransmission bitmap, and
each bit in the retransmission bitmap indicates whether a corresponding frame will be retransmitted in case of non-acknowledgment of that frame or that a discarded frame will not be transmitted;
means for transmitting the BARP frame to a receiver device separate from the block of frames; and
means for transmitting non-discarded frames in the block of frames to the receiver.

28. The transmitter device of claim 27, further comprising:
means for encapsulating data in the block of frames, where each frame is individually identified by a sequence number.

29. A non-transitory computer-readable medium comprising instructions operational in a transmitter device, which when executed by a processor causes the processor to:
assign a sequence number to each frame in a block of frames;
discard one or more frames in the block of frames;
generate a block acknowledgement retransmission policy (BARP) frame that individually identifies a retransmission policy for each frame in the block of frames, wherein:
the BARP frame comprises a traffic identifier, a starting sequence number, and a retransmission bitmap,
the traffic identifier identifies a related data flow and block ack agreement,
the starting sequence number indicates a sequence number corresponding to a frame associated with a first bit in the retransmission bitmap, and
each bit in the retransmission bitmap indicates whether a corresponding frame will be retransmitted in case of non-acknowledgment of that frame or that a discarded frame will not be transmitted;
transmit the BARP frame to a receiver device separate from the block of frames; and
transmit non-discarded frames in the block of frames to the receiver.

30. The non-transitory computer-readable medium of claim 29, further comprising instructions which when executed by the processor causes the processor to further:
encapsulate data in the block of frames, where each frame is individually identified by a sequence number.

31. A method operational on a receiver device, comprising:
receiving a block acknowledgement retransmission policy (BARP) frame that individually identifies a retransmission policy for each frame in a block of frames separate from the block of frames, wherein:
the BARP frame comprises a traffic identifier, a starting sequence number, and a retransmission bitmap,
the traffic identifier identifies a related data flow and block ack agreement,
the starting sequence number indicates a sequence number corresponding to a frame associated with a first bit in the retransmission bitmap, and
each bit in the retransmission bitmap indicates whether a corresponding frame will be retransmitted in case of non-acknowledgment of that frame or that a discarded frame will not be transmitted; and
receiving the block of frames.

32. The method of claim 31, further comprising:
sending a block acknowledgment indicating missing frames that should be retransmitted based on the BARP frame.

33. The method of claim 31, further comprising:
sending received frames to a higher layer of a protocol stack if all frames that have been identified for retransmission in the BARP frame have been received.

34. The method of claim 31, further comprising:
receiving missing frames which the BARP frame identified for retransmission.

35. The method of claim 31, wherein the block of frames includes both high-reliability frames and low-reliability frames.

36. The method of claim 35, wherein high-reliability frames are defined for retransmission and low-reliability frames are defined for no retransmission.

37. The method of claim 31, wherein a retransmission policy specified by the BARP frame defines which frames in the block of frames are to be retransmitted and which frames are not to be retransmitted.

38. The method of claim 31, wherein frames that require acknowledgement by their sender are identified for retransmission by the BARP frame.

39. The method of claim 31, wherein frames that do not require acknowledgement by their sender are identified for no retransmission by the BARP frame.

40. The method of claim 31, wherein the block of frames includes frames containing content from a plurality of different senders, where high-reliability content is sent over frames designated for retransmission.

41. The method of claim 31, wherein BARP frame is received before and/or after the block of frames.

42. The method of claim 31, wherein the BARP frame is received periodically or asynchronously or incidentally.

43. The method of claim 31, wherein the BARP frame is transmitted as part of an aggregated Media Access Control (MAC) Protocol Data Unit (MPDU).

44. The method of claim 31, wherein the receiver device uses the BARP frame to determine which frames in the block of frames should be dropped.

45. The method of claim 31, wherein the receiver device uses the BARP frame to determine which frames in the block of frames are necessary.

46. The method of claim 31, wherein the BARP frame comprises more than one traffic identifier, starting sequence number, and retransmission bitmap.

47. A receiver device, comprising:
 a communication interface for communicating with a transmitter device;
 a processing circuit coupled to the communication interface and memory device, the processing circuit adapted to:
  receive a block acknowledgement retransmission policy (BARP) frame that individually identifies a retransmission policy for each frame in a block of frames separate from the block of frames, wherein:
   the BARP frame comprises a traffic identifier, a starting sequence number, and a retransmission bitmap,
   the traffic identifier identifies a related data flow and block ack agreement,
   the starting sequence number indicates a sequence number corresponding to a frame associated with a first bit in the retransmission bitmap, and
   each bit in the retransmission bitmap indicates whether a corresponding frame will be retransmitted in case of non-acknowledgment of that frame or that a discarded frame will not be transmitted; and
  receive the block of frames.

48. The receiver device of claim 47, wherein the communication interface includes a wireless transceiver circuit adapted for wireless communications.

49. The receiver device of claim 47, further comprising:
 a memory device for storing a protocol stack associated with transmissions over the communication interface.

50. The receiver device of claim 47, wherein the processing circuit is further adapted to:
 send received frames to a higher layer of a protocol stack if all frames that have been identified for retransmission in the BARP frame have been received.

51. The receiver device of claim 47, wherein the processing circuit is further adapted to:
 send a block acknowledgment indicating missing frames that should be retransmitted based on the BARP frame; and
 receive missing frames which the BARP frame identified for retransmission.

52. The receiver device of claim 47, wherein the block of frames is received at a data link layer of a protocol stack.

53. A receiver device, comprising:
 means for receiving a block acknowledgement retransmission policy (BARP) frame that individually identifies a retransmission policy for each frame in a block of frames separate from the block of frames, wherein:
  the BARP frame comprises a traffic identifier, a starting sequence number, and a retransmission bitmap,
  the traffic identifier identifies a related data flow and block ack agreement,
  the starting sequence number indicates a sequence number corresponding to a frame associated with a first bit in the retransmission bitmap, and
  each bit in the retransmission bitmap indicates whether a corresponding frame will be retransmitted in case of non-acknowledgment of that frame or that a discarded frame will not be transmitted; and
 means for receiving the block of frames.

54. A non-transitory computer-readable medium comprising instructions operational in a receiver device, which when executed by a processor causes the processor to:
 receive a block acknowledgement retransmission policy (BARP) frame that individually identifies a retransmission policy for each frame in a block of frames separate from the block of frames, wherein:
  the BARP frame comprises a traffic identifier, a starting sequence number, and a retransmission bitmap,
  the traffic identifier identifies a related data flow and block ack agreement,
  the starting sequence number indicates a sequence number corresponding to a frame associated with a first bit in the retransmission bitmap, and
  each bit in the retransmission bitmap indicates whether a corresponding frame will be retransmitted in case of non-acknowledgment of that frame or that a discarded frame will not be transmitted; and
 receive the block of frames.

\* \* \* \* \*